Patented Oct. 1, 1929

1,729,651

UNITED STATES PATENT OFFICE

ERNEST ALFRED HAUSER, OF FRANKFORT-ON-THE-MAIN, GERMANY, ASSIGNOR TO K. D. P. LIMITED, OF LONDON, ENGLAND, A BRITISH COMPANY

MANUFACTURE OF RUBBER

No Drawing. Application filed December 16, 1925, Serial No. 75,887, and in Great Britain December 19, 1924.

This invention relates to a process for the production of compounded rubber, balata, guttapercha, and analogous vegetable resins, and to the manufacture of articles prepared from the same.

In the ordinary manufacture of compounded rubber goods the crude rubber, obtained by coagulating latex as it comes from the tree, is washed, dried and either sheeted or creped. In this form it is shipped to the factory, where it is necessary to masticate the crude rubber in order that compounding and vulcanizing ingredients can be homogeneously dispersed through it, after which moulded and other articles may be made from the masticated compounded rubber. In this process mastication is necessary for two purposes, firstly in order to mix the compounding ingredients uniformly through the rubber and secondly in order to make the rubber plastic so that it may be moulded or otherwise worked. It is now recognized that the amount of mastication necessary to incorporate large proportions of compounding ingredients, e. g. carbon black, is deleterious to the rubber. Apart from the mechanical tearing action of the mills which itself harms the rubber, it is certain that the local high temperatures brought about in the rubber owing to the heat developed during mastication, reduce the tensile strength and ageing properties of the vulcanized product. Moreover mastication causes the rubber mix to absorb large amounts of oxygen which detrimentally influence the ageing properties. In addition to these disadvantages the hitherto known process involves on the plantation the use of moderately expensive coagulating agents such as acetic acid and a tedious drying process, while in the factory the heavy machinery which is necessary for the mastication and the enormous power consumption are responsible for a large part of the manufacturing costs of the finished rubber article.

In order to overcome these disadvantages, a number of proposals have been made which attempt to avoid mastication, while nevertheless producing a compounded rubber.

According to some of these proposals, colloidal compounding ingredients and vulcanizing agents are mixed with the latex which may or may not have been preserved by means of ammonia, or another preservative and from which some water may or may not have been removed, and the rubber contents and compounding ingredients are separated from the water in various ways. For example, this may be done by coagulation, or by using compounding ingredients or vulcanizing agents for said coagulation, or finally by removal of the water. By these means a compounded rubber is obtained which may or may not be subjected to a drying process, for example by spray-drying.

Another method by means of which it is possible to obtain an unmasticated compounded rubber, consists in adding a vulcanizing agent and compounding material to latex, vulcanizing the mixture under such conditions as to preclude any substantial coagulation during said vulcanization, and separating the compounded vulcanized rubber from the vulcanized aqueous products. This can be done by evaporation to obtain a solid compounded sheet rubber, or by coagulation, whereby a coagulation of compounded vulcanized rubber ingredients is obtained.

Still another method consists in preparing compounded rubber by spray-drying latex and blowing the powdered vulcanizing and compounding ingredients separately into the latex spray.

Although by these known suggestions a compounded rubber can be obtained which has not been subjected to mastication yet these processes have various disadvantages e. g., they are unsuitable for the manufacture of moulded, calendered or other articles since it is very difficult to obtain in this way a uniform dispersion of the fillers, and moreover when the latex has been coagulated, a large amount of moisture remains in the coagulum from which it can only be removed with great difficulty, and even when this has been accomplished it is not possible owing to its toughness, to mould the dry compounded rubber without resorting to mastication. The reason for this failure of the known processes is probably due to the fact that latex or concentrated latex to which compounding and vulcanizing ingredients have been added has lost some of its colloidal properties which can be easily ascertained when water is added to the compounded product. This product even when unmasticated cannot be reconverted into the original latex by the addition of water.

The present invention aims at overcoming the aforementioned disadvantages, and provides a process for preparing compounded rubber, which can be used directly without rolling for the manufacture of all kinds of rubber.

In the specification of my copending application No. 675,297 filed on the 17th November, 1923, I have described and claimed processes for producing a paste-like water-soluble caoutchouc product from latex, which can be reconverted into the original latex by the addition of water. This process consists in adding to the latex of rubber, balata, guttapercha and analogous vegetable resins, suitable kinds of protective colloids, in such amounts that on removing the water from said latex by evaporation, vacuum-drying, spray-drying or by filtration, ultra-filtration or dialysis a paste-like product results which can be reconverted into the original latex by the addition of water. Thus it is possible by means of this process to convert the latex at the plantation into a paste-like product, which can be shipped to the rubber factory, all that is necessary, being to add water to obtain latex similar in properties to the original freshly tapped latex.
My experiments have shown that direct use can be made of this concentrated latex paste without reconstituting it to its original state by the addition of water. I have found that it is possible to produce a dry compounded rubber mixture containing inorganic or organic fillers, vulcanizing ingredients, accelerators, colours, pigments, dyes or the like directly from this rubber latex paste and to prepare rubber articles without the necessity of mastication or after a very short rolling process.

According to the preferred form of the invention protective colloids or emulsifying agents are added to the freshly tapped rubber latex, in such amounts that when substantially all the water is immediately removed from the latex by evaporation, vacuum-drying, air-drying, spray-drying or the like process, (under such conditions that coagulation does not occur), a paste-like product results which has the property of being reconverted into the original latex by the addition of water. I preferably remove the water to such an extent that the paste contains 80–90% of solid matter. This material is then shipped to the rubber factory where the necessary compounding and vulcanizing ingredients are added. Inasmuch as reversible colloids can already be pectized by mechanical action and inasmuch as, in contradistinction to the known processes of producing unmasticated compounded rubber, the compounded rubber of the present invention should not lose any of the colloidal properties of the original latex (i. e. the compounded rubber mix should be reconvertible into the original liquid latex containing compounding ingredients and vulcanizing agents provided that the mix is still moist), it is necessary to effect the mixing under such conditions that the least possible mechanical friction is exerted upon the reversible concentrated latex.

The compounding and vulcanizing ingredients are gradually added to the latex paste in any suitable form e. g. as a fine dry powder, as a wet paste or cream or in a suspended, emulsified or dissolved condition with or without the known addition of protective agents to retard or inhibit premature coagulation, in a suitable mixing machine, in which the mixing can be effected with the least possible friction, until the compounding ingredients are uniformly dispersed.

It is preferable that the mass should not be allowed to dry during the mixing and therefore so much water is added during the mixing process, that the original content of free water in the mix is maintained constant or preferably kept at about 25 per cent. It should be borne in mind that certain compounding ingredients and vulcanizing agents absorb or adsorb greater or less amounts of water. This addition of water also facilitates the thorough dispersion of the compounding and vulcanizing ingredients in the latex paste.

The compounding and vulcanizing ingredients are thoroughly dispersed throughout the rubber latex paste within a few minutes and it will be found that a very fine foam is formed within the mix, which is only visible under a magnifying glass.

This foamy mass consisting of thoroughly compounded rubber latex paste, in which the latex can still be brought back into its original state without having lost its colloidal properties, is thereupon dried for example by flattening it out on a drying plate until a dry compounded rubber is obtained, which can be used directly without mastication or plastification for the manufacture of various articles, for example it can be placed directly in moulds wherein it can be vulcanized in the final form in which it is required,

Alternatively the compounded foamy rubber latex paste is dried to form a skin and this skin may be plastified by passing it through rollers which may be heated, until already after a few minutes plastification sets in. This plastified rubber is then worked up into the desired articles.

The plastified mass obtained is quite different from the usual plastified compounded rubber, being much softer, for example it can be worked up by squirting, pressing or moulding without the necessity of heating. Thus for example seamless rubber tubes can be squirted in the cold and after squirting, only vulcanizing is required to obtain rubber tubing of considerable strength.

*Example I*

40 parts of sulphur, 100 parts zinc oxide, 6 parts oil red G and 344 parts whiting are incorporated in a suitable mixing machine into 400 parts of caoutchouc latex concentrated into the form of a paste containing 75 percent solid constituents, and the resulting mass is dried. Thereupon the dried compounded mass is passed for five minutes between rollers and introduced into a tube squirting machine.

*Example II*

5 parts sulphur, 15 parts zinc oxide and 30 parts of carbon black are incorporated into 100 parts of concentrated caoutchouc latex in the form of a paste containing 75 percent solid constituents and the mass is further worked up in the manner described in Example I.

Apart from the commercial advantages and the above described economy resulting from the process, I have found, that the usual tests carried out on the physical state of the rubber obtained by this process show exceptionally good properties owing to the fact that the rubber has never been masticated.

In the preferred form of carrying out the invention, I have mentioned that the best results are obtained when starting with a concentrated latex containing about 20% moisture prepared in the east from freshly tapped latex. However, I do not limit my invention to this particular way of carrying it out, because it is quite possible to use as starting material for the process latex that has been transported as such or in concentrated condition.

I wish it to be understood that the term "rubber latex" includes the latex obtained from balata, guttapercha, and analogous vegetable resins.

I claim:—

1. Process for producing from latex of a vegetable resin such as caoutchouc latex a compounded product containing all the solid and dissolved constituents of the original latex and in which the latex is still in a reversible condition, said process comprising adding protective agents to said latex, submitting said latex to concentration by evaporation until a completely reversible colloidal paste-like product is obtained, gradually mixing compounding and vulcanizing ingredients thereto, uniformly dispersing said compounding and vulcanizing ingredients in said paste-like product whilst conserving the colloidal properties and stability of the latex towards friction, pressure, agitation and the like, by effecting and continuing said mixing with the least possible friction until the aforesaid compounded product is obtained.

2. Process for producing from latex of a vegetable resin such as caoutchouc latex a compounded product containing all the solid and dissolved constituents of the original latex and in which the latex is still in a reversible condition, said process comprising adding protective agents to said latex, submitting said latex to concentration by evaporation, until a completely reversible colloidal paste-like product is obtained, gradually mixing compounding and vulcanizing ingredients thereto, uniformly dispersing said compounding and vulcanizing ingredients in said paste-like product whilst maintaining the percentage of free water in said mixture at about 25% and whilst conserving the colloidal properties and stability of the latex towards friction, pressure, agitation and the like, by effecting and continuing said mixing with the least possible friction until the aforesaid compounded product is obtained.

3. Process for producing from latex of a vegetable resin such as caoutchouc latex a compounded product containing all the solid and dissolved constituents of the original latex and in which the latex is still in a reversible condition, said process comprising adding protective agents to said latex, submitting said latex to concentration by evaporation, until a completely reversible colloidal paste-like product is obtained, gradually mixing compounding and vulcanizing ingredients thereto, uniformly dispersing said compounding and vulcanizing ingredients in said paste-like product whilst conserving the colloidal properties and stability of the latex towards friction, pressure, agitation and the like, by effecting and continuing said mixing with the least possible friction until the aforesaid compounded product is obtained, and thereupon drying said compounded paste in a concrete form.

4. Process for producing from latex of a vegetable resin such as caoutchouc latex a compounded product containing all the solid and dissolved constituents of the original latex and in which the latex is still in a reversible condition, said process comprising adding protective agents to said latex, submitting said latex to concentration by evaporation until a completely reversible colloidal paste-like product is obtained, gradually mixing compounding and vulcanizing ingredients thereto, uniformly dispersing said compounding and vulcanizing ingredients in said paste-like product whilst maintaining the percentage of free water in said mixture at about 25% and whilst conserving the colloidal properties and stability of the latex towards friction, pressure, agitation and the like, by effecting and continuing said mixing with the least possible friction until the aforesaid compounded product is obtained and thereupon drying said compounded paste in a concrete form.

5. Process for producing from latex of a vegetable resin such as caoutchouc latex a compounded product containing all the solid and dissolved constituents of the original latex and in which the latex is still in a reversible condition, said process comprising adding protective agents to said latex, submitting said latex to concentration by evaporation until a completely reversible colloidal paste-like product is obtained, gradually mixing compounding and vulcanizing ingredients thereto, uniformly dispersing said compounding and vulcanizing ingredients in said paste-like product whilst maintaining the percentage of free water in said mixture at about 25% and whilst conserving the colloidal properties and stability of the latex towards friction, pressure, agitation and the like, by effecting and continuing said mixing with the least possible friction until the aforesaid compounded product is obtained, thereupon drying said compounded product in a concrete form and submitting the dry compounded mass to plastification for example by rolling same for a short period.

6. Process for producing from latex of a vegetable resin such as caoutchouc latex a compounded product containing all the solid and dissolved constituents of the original latex and in which the latex is still in a reversible condition, said process comprising adding protective agents to said latex, submitting said latex to concentration by evaporation until a completely reversible colloidal paste-like product is obtained, gradually mixing compounding and vulcanizing ingredients thereto, uniformly dispersing said compounding and vulcanizing ingredients in said paste-like product whilst maintaining the percentage of free water in said mixture at about 25% and whilst conserving the colloidal properties and stability of the latex towards friction, pressure, agitation and the like, by effecting and continuing said mixing with the least possible friction until the aforesaid compounded product is obtained, thereupon drying said compounded product in a concrete form, shaping the dry compounded product by moulding, pressing, squirting and the like and vulcanizing the shaped product.

7. Process for producing from latex of a vegetable resin such as caoutchouc latex a compounded product containing all the solid and dissolved constituents of the original latex and in which the latex is still in a reversible condition, said process comprising adding protective agents to said latex, submitting said latex to concentration by evaporation, gradually mixing compounding and vulcanizing ingredients thereto, if desired during said concentration, uniformly dispersing said compounding and vulcanizing ingredients in said latex whilst conserving the colloidal properties and stability of the latex towards friction, pressure, agitation and the like, by effecting and continuing said mixing with the least possible friction until the aforesaid compounded product is obtained.

8. Process for producing from latex of a vegetable resin such as caoutchouc latex a compounded product containing all the solid and dissolved constituents of the original latex and in which the latex is still in a reversible condition, said process comprising adding protective agents to said latex, submitting said latex to concentration by evaporation, gradually mixing compounding and vulcanizing ingredients thereto, if desired during said concentration, uniformly dispersing said compounding and vulcanizing ingredients in said latex whilst maintaining the percentage of free water in said mixture at about 25% and whilst conserving the colloidal properties and stability of the latex towards friction, pressure, agitation and the like, by effecting and continuing said mixing with the least possible friction until the aforesaid compounded product is obtained.

9. Process for producing from latex of a vegetable resin such as caoutchouc latex a compounded product containing all the solid and dissolved constituents of the original latex and in which the latex is still in a reversible condition, said process comprising adding protective agents to said latex, submitting said latex to concentration by evaporation, gradualy mixing compounding and vulcanizing ingredients thereto, if desired during said concentration, uniformly dispersing said compounding and vulcanizing ingredients in said latex whilst conserving the colloidal properties and stability of the latex towards friction, pressure, agitation and the like, by effecting and continuing said mixing with the least possible friction until the aforesaid compounded product is obtained and thereupon drying said compounded product in a concrete form.

10. Process for producing from latex of a vegetable resin such as caoutchouc latex a compounded product containing all the solid and dissolved constituents of the original latex and in which the latex is still in a reversible condition, said process comprising adding protective agents to said latex, submitting said latex to concentration by evaporation, gradually mixing compounding and vulcanizing ingredients thereto, if desired during said concentration, uniformly dispersing said compounding and vulcanizing ingredients in said latex whilst maintaining the percentage of free water in said mixture at about 25% and whilst conserving the colloidal properties and stability of the latex towards friction, pressure, agitation and the like, by effecting and continuing said mixing with the least possible friction until the aforesaid compounded product is obtained and thereupon drying said compounded product in a concrete form.

11. Process for producing from latex of a vegetable resin such as caoutchouc latex a compounded product containing all the solid and dissolved constituents of the original latex and in which the latex is still in a reversible condition, said process comprising adding protective agents to said latex, submitting said latex to concentration by evaporation, gradually mixing compounding and vulcanizing ingredients thereto, if desired during said concentration, uniformly dispersing said compounding and vulcanizing ingredients in said latex whilst maintaining the percentage of free water in said mixture at about 25% and whilst conserving the colloidal properties and stability of the latex towards friction, pressure, agitation and the like, by effecting and continuing said mixing with the least possible friction until the aforesaid compounded product is obtained, thereupon drying said compounded product in a concrete form and submitting the dry compounded mass to plastification for example by rolling same for a short period.

12. Process for producing from latex of a vegetable resin such as caoutchouc latex a compounded product containing all the solid and dissolved constituents of the original latex and in which the latex is still in a reversible condition, said process comprising adding protective agents to said latex, submitting said latex to concentration by evaporation, gradually mixing compounding and vulcanizing ingredients thereto, if desired during said concentration, uniformly dispersing said compounding and vulcanizing ingredients in said latex whilst maintaining the percentage of free water in said mixture at about 25% and whilst conserving the colloidal properties and stability of the latex towards friction, pressure, agitation and the like, by effecting and continuing said mixing with the least possible friction until the aforesaid compounded product is obtained, thereupon drying said compounded product in a concrete form shaping the dry compounded product by moulding, pressing, squirting and the like and vulcanizing the shaped product.

13. A colloidal composition of matter comprising caoutchouc latex containing upwards of 75% of solid constituents and all the solid and dissolved constituents of the original latex in association with compounding ingredients, the latex in said composition being stable towards friction, pressure, agitation and the like and being capable, on the addition of water, of reconversion into its original state free from coagulated or agglomerated matter.

14. A compounded concentration product containing latex and all the solid and dissolved constituents of the original latex and compounding ingredients, the latex in said concentration product being stable towards friction, pressure, agitation and the like and being capable, on addition of water, of reconversion into its original state free from coagulated or agglomerated matter.

In testimony whereof I affix my signature.

ERNEST ALFRED HAUSER.